United States Patent [19]
Zabrocki et al.

[11] Patent Number: 4,755,576
[45] Date of Patent: Jul. 5, 1988

[54] COPOLYMERS OF ALPHA-METHYL STYRENE AND ACRYLONITRILE

[75] Inventors: Karl Zabrocki, Buettgen; Rainer Fritz, Cologne; Alfred Pischtschan, Kuerten, all of Fed. Rep. of Germany

[73] Assignee: Bayer Aktiengesellschaft, Leverkusen, Fed. Rep. of Germany

[21] Appl. No.: 765,601

[22] Filed: Aug. 14, 1985

[30] Foreign Application Priority Data

Aug. 24, 1984 [DE] Fed. Rep. of Germany ....... 3431194

[51] Int. Cl.$^4$ .............................................. C08F 12/12
[52] U.S. Cl. ................................................... 526/342
[58] Field of Search .......................................... 526/342

[56] References Cited

U.S. PATENT DOCUMENTS 3,491,071 1/1970 Lanzo .................................. 526/342
4,340,723 7/1982 Duyzings ............................ 526/342
4,361,684 11/1982 Minematsu .......................... 526/342
4,536,556 8/1985 Tijssen ................................ 526/342

FOREIGN PATENT DOCUMENTS 0041703 6/1981 European Pat. Off. .

Primary Examiner—Paul R. Michl
Attorney, Agent, or Firm—Connolly & Hutz

[57] ABSTRACT

Copolymers of from 65 to 75%, by weight, of α-methyl styrene and from 35 to 25%, by weight, of α-methyl styrene and from 35 to 25%, by weight, of acrylonitrile, obtainable by radical emulsion polymerization, the monomers being metered in during the course of the polymerization, wherein the molar ratio:

$$\frac{(\text{mol }\alpha\text{-methyl styrene})}{(\text{mol acrylonitrile})}$$

of the unreacted monomers in the reaction mixture is maintained during the metering phase between 0.7 and 1.25.

4 Claims, No Drawings

COPOLYMERS OF ALPHA-METHYL STYRENE AND ACRYLONITRILE

Copolymers of α-methyl styrene and acrylonitrile are used technically for the production of thermoplastic moulding compositions which have dimensional stability under heat, for example of the ABS type, or of mixtures, for example of ABS with polyvinyl chloride, polycarbonate or polyesters.

They are generally produced by emulsion polymerisation, in which the monomer mixture is added to a radical initiator and emulsifier-containing aqueous phase and is polymerised at a temperature of from 40° to 80° C. In order that the heat of polymerisation may easily be removed, the monomer mixture is metered in over several hours, particularly in large-scale production.

α-methyl styrene/acrylonitrile resins suitable for thermoplasts having dimensional stability under heat, herein referred to as "AMS resins", generally contain polymerised from 65 to 80%, by weight, of α-methyl styrene and from 35 to 20%, by weight, of acrylonitrile. If these resins are produced by conventional emulsion polymerisation, then products are obtained which have high proportions of acrylonitrile units bound to each other, herein referred to as "Acn sequences". These sequences lower the glass transition temperature of the copolymer and thus the dimensional stability under heat of the corresponding moulding compositions, and substantially colour the resin composition at a relatively high processing temperature, for example from 240° to 300° C.

From EP-A No. 0 041 703, a process is known in which low residual monomer products having low thermal discolouration are obtained by maintaining particularly concentrations of acrylonitrile in the reaction mixture. However, these AMS resins have only moderate strength in combination with graft rubbers; at high processing temperatures, surface blemishes are formed (see comparison experiments a and b).

In DE-OS No. 3,128,370 (=British Pat. No. 2,101,143), a process for the production of AMS resins is described, in which resin composition which are non-discolouring and dimensionally stable under heat are obtained, by maintaining the molar ratio of α-methyl styrene; acrylonitrile at from 1.3:1 to 3.0:1 up to a conversion of 90%. However, the polymerisation ceases at about 97% conversion, so that large quantities of residual monomers remain; mixtures with graft rubber (see comparison examples c and d), have insufficient low temperature impact resistance.

AMS resins with small quantities of Acn sequences are produced according to the present invention, which resins can be processed to thermoplasts having simultaneously high dimensional stability under heat, impact strength at +20° C. and −40° C. and good injection moulding ability, as well as low discolouring tendency, and, in the production thereof in emulsion, converisons of >97%, as well as low residual monomer contents are achieved.

The present invention provides copolymers of from 65 to 75%, by weight, of α-methyl styrene and from 35 to 25% by weight, of acrylonitrile, obtainable by radical emulsion polymerisation, the monomers being metered in during the course of the polymerisation, wherein the molar ratio:

$$\frac{(\text{mol }\alpha\text{-methyl styrene})}{(\text{mol acrylonitrile})}$$

of the unreacted monomers in the reaction mixture is maintained during the metering phase between 0.7 and 1.25.

In principle, known emulsion polymerisation techniques for the production of the copolymers are suitable according to the present invention. The following procedure has shown to be particularly favourable: An aqueous phase is provided in a quantity of from 150 to 300%, by weight, (based on the quantity of monomer to be polymerized); it contains the emulsifier, as well as optionally the initiator and a regulator.

After heating the charge to the desired polymerisation temperature (from 30° to 90° C., preferably from 60° to 80° C.), the monomers are added during from 4 to 7 hours, for example, further initiators are optionally fed in and the mixtures allowed to react to completion. The resin latex obtained is coagulated in known manner, optionally after mixing with further polymer latices, as well as optionally after addition of additives, washed, dried and further processed thermoplastically.

Conventional, preferably anionic, emulsifiers may be used as emulsifiers for emulsion polymerisation, for example resin soaps, fatty acid soaps, acrylic sulphonates, aralkyl sulphonates, alkyl sulphonates, aralkyl carboxylates, alkyl sulphates; resin soaps and $C_{12}$–$C_{18}$ alkyl sulphonates are particularly suitable.

Water-soluble initiators are preferred for example persulphates, perphosphates and redox systems. When using redox systems based on organic compounds, these may also be added to the monomer solution in a dissolved state. Examples of initiators are $K_2S_2O_8$, $(NH_4)_2S_2O_8$, the redox systems cumene hydroperoxide/$Fe^{2+}$/rongalite (i.e. sodium formaldehyde-sulfoxylate), p-methane hydroperoxide/$Fe^{2+}$/rongalite, diisopropylbenzene hydroperoxide/$Fe^{2+}$/ascorbic acid.

Organic sulphur compounds, such as mercaptans and disulphides—long chain mercaptans, for example n- and t-dodecyl mercaptan, being preferred—are generally used as regulators for adjusting the molecular weight. It is expedient to dissolve the regulators in the monomer mixture.

Emulsifiers, initiators and regulators may likewise be introduced into the aqueous phase or also metered in separately as further additions over the polymerisation period.

The reaction temperature is primarily dependent on the initiator system and the technical possibilities for removing the polymerisation heat. Redox-activated systems polymerise at from 30° to 50° C., while persulphate-activated systems require temperatures of from 65° to 80° C.

Emulsion polymerisations according to the present process achieve conversions of >97%, generally ≧98%, and result in low residual monomer contents.

The weight ratio of the total metered monomers α-methyl styrene and acrylonitrile is from 65:35 to 75:25. The monomers may be added to the reaction mixture individually or as a common solution, a uniform addition over a period of from 4 to 7 hours being preferred. It is important according to the present invention that the rate of addition, the ratio of the added monomers and the reaction of the monomers in the emulsion are coordinated such that the molar ratio.

$$\frac{(\text{mol } \alpha\text{-methyl styrene})}{(\text{mol acrylonitrile})}$$

of the unreacted monomers during the total metering time is from 0.7 to 1.25. If the molar ratio is smaller, then thermo-unstable, yellowing products are obtained; if it is larger, then the residual monomer content substantially increase and the strength (mixed with graft rubber) of the product is reduced.

The molar ratio of the unreacted monomers may be determined by taking latex samples from the reacting mixture, termination is carried out by the conventional methods, for example using phenothiazine, and the remaining monomers are quantitatively determined by means of headspace gas chromatography.

The following measures are to be mentioned for maintaining the molar ratio range according to the present invention:

increasing the rate of the addition of acrylonitrile when the molar ratio exceeds 1.25;

increasing the rate of the addition of $\alpha$-methylstyrene when the molecular weight range falls short of 0.7;

since acrylonitrile usually reacts more quickly than $\alpha$-methyl styrene, an increase in the metering rate of the two monomers, or the mixtures thereof, is likewise applied here.

Particularly favourable ratios exist if the weight ratios of the two monomers are from 69:31 to 73:27, particularly from 71:29 to 73:27. Maintaining the molar ratio according to the present invention is generally possible by simply adapting the rate of addition of the corresponding monomer mixture.

In order to be suitable for thermoplastic mixtures, the AMS resins generally has to have a mean molecular weight of from $5 \times 10^4$ to $5 \times 10^5$, preferably from $10^5$ to $2 \times 10^5$ (viscosimetric determination according to H. Baumann, H. Lange: Angew. Makro. Chem., 2, (1969), p. 16-34). Means for adjusting the molecular weights include the type and quantity of initiator, as well as the addition of regulator, and are known to those skilled in the art.

For determining the amount of Acn sequences, nuclear magnetic resonance spectroscopy was used as described, by D. J. T. Hill et al, Macromolecules, 1982, 15 960-66, which is hereby incorporated by reference. For the present investigations, measuring was carried out at a frequency of 50.3 MHz and the distribution of the triads SAS, AAS+SAA, AAA was determined using the nitrile carbon atom of the acrylonitrile [S=$\alpha$-methylstyrene, A=acrylonitrile]. It was hereby found that the amount of AAA triads has to be less than 15% (based on the sum of the triads listed above), in order to achieve thermally stable products having little yellowing tendency.

The AMS resin emulsions obtained according to the present invention may be further processed according to known processes. For example, after addition of additives, such as stabilizers, antioxidants, age resistors, they are optionally mixed with latices of graft rubbers, coagulated, washed, freed from water and dried, so that pulverulent polymer mixtures are obtained. It is likewise possible to precipitate the AMS resin latices alone in the manner indicated and then to process them further alone or mixed with other polymers. Thermoplasts which are dimensionally stable under heat and are non-discolouring can for example, be produced, when AMS resins according to the present invention are mixed with other thermoplastic materials and/or graft rubbers. The following can be used as mixing components: Graft polymers of polymerizable resin forming monomers such as styrene, acrylonitrile, $\alpha$-methylstyrene methylmethacrylate on e.g. polybutadiene rubbers, acrylate rubbers (e.g. cross-linked polybutylacrylate) EPDM rubbers (i.e. ethylene-propylene-diene monomer rubbers), in which the described graft polymers can be combined with resinous polymers and copolymers consisting from the said monomers, polyvinyl chloride, polycarbonate, polyamide, aromatic polyesters. Graft rubbes of styrene/acrylonitrile and polybutadiene are particularly suitable. These materials are produced, for example, by emulsion polymerisation of from 70 to 30 parts, by weight, of the given monomers in the presence of from 30 to 70 parts, by weight, of at least one polybutadiene latex, the particle size of which is from 0.05 to 1.0 $\mu$m. Such systems are described, for example, in DAS No. 2,420,358; the rubber proportion of the total mixture is thereby generally from 10 to 35%, by weight.

The AMS resins produced according to the present invention can be mixed with such materials by means of conventional mixing machines, for example screws, kneaders, rubber mills, and may then be further processed to the final moulding by injection moulding, extrusion or blowing processing. In these processes, conventional additives, such as lubricants, mould release agents, dyestuffs, stabilizers anti-static agents, flameproofing agents, filling and reinforcing materials, for example glass fibres, are added. Moulding may be effected on conventional processing, plate extrusion, hot forming, cold forming, calender processing etc.

Comparative Experiments a–d

The comparison experiments of Table I illustrate the prior art:

AMS resins are produced according to the literature citation given and are further processed as follows:

77.5%, by weight, of AMS resin and 22.5%, by weight, of a graft polymer system of 50 parts by weight of styrene and acrylonitrile (weight ratio 72:28) on 50 parts by weight of polybutadiene both in latex form are mixed, treatd with stabilizers, coagulated with heating at a pH of from 4 to 5 by addition of salt, washed, dried and then kneaded after addition of a lubricant and injection moulded to form test samples.

The following tests are carried out:

Impact strength at room temperature $a_k{}^{RT}$ and at $-40°$ C. $a_k-40$ according to DIN 53 543; ball hardness according to DIN 53 546; dimensional stability under heat according to Vicat B; surface quality qualitative assessment. For assessing the residual monomer content, the conversion of the AMS polymerisation is given, determined by gravimetric analysis of the latex.

TABLE I

| Comparative citation experiments | conversion AMS polymerisation % by weight | $a_k$ RT [kJ/m²] | $a_k$ −40° [kJ/m²] | $H_c$ [MPa] | Vicat [°C.] | Surface |
|---|---|---|---|---|---|---|
| (a) Example 1 EP-A 41 703 | 95 | 8.5 | 1.8 | 114 | 103 | at 280° |

TABLE I-continued

| Comparative citation experiments | conversion AMS polymerisation % by weight | $a_k$ RT [kJ/m$^2$] | $a_k$ −40° [kJ/m$^2$] | $H_c$ [MPa] | Vicat [°C.] | Surface |
|---|---|---|---|---|---|---|
| (b) Example 2 EP-A 41 703 | 97 | 7.6 | 3.9 | 119 | 106 | mass temperature substantial formation of streaks |
| (c) Example 1 GB-PS 2101143 | 97 | 7.5 | 1.6 | 117 | 114 | glossy |
| (d) Example 4 GB-PS 2101143 | 96.3 | 8.1 | 1.7 | 116 | 116 | light |

Comparative Experiments e–i

Examples 1–4

1. Production of the Copolymers

The copolymers are produced by potassium persulphate-activated emulsion polymerisation at 75° C. according to known methods using an alkyl sulphonate as emulsifier. The monomer α-methyl styrene and acrylonitrile are metered in over 6 hours and the molar ratio of the unreacted monomers is determined at the following times by means of head space gas chromatography:

| Sample ①: | 1½ h; | Sample ②: | 3h; |
|---|---|---|---|
| Sample ③: | 4½ h; | Sample ④: | 6h; |

After 6½ h, a small amount of potassium persulphate is added and left to react to completion for a further 2 h at 75° C. The conversion is then gravimetrically determined, the quantities of regulator (t-dodecyl mercaptan) and initiator (potassium persulphate) are such that the average molecular weight Mw of the resin polymers is from 70,000 to 90,000.

The determination of the Acn sequence amount was by nuclear magnetic resonance measurement.

The resin polymers are mixed with graft polymer as in comparative experiments a to d, precipitated, dried, processed to test samples and tested according to th above methods.

For evaluating the heat discoloration, platelets of about 4×6 cm are injection moulded at 280° C. mass temperature and the discolouring is qualitatively assessed.

Table II gives an overview of experimental data and test results. It shows that only by maintaining the remaining monomers at ratios according to the present invention, there are obtained products with high conversion in the polymerisation, as well as good surface quality and low discolouration.

TABLE 2

| Comparative Example | weight ratio of the monomers used Ams/Acn | molar ratio of the residual monomers during the metering phase Ams/Acn | | | | final conversion (%) | %-proportion in combination with graft polymer | | | |
|---|---|---|---|---|---|---|---|---|---|---|
| | | ① | ② | ③ | ④ | | of AAA sequences | notched impact strength [kJ/m$^2$] | Vicat value (°C.) | surface quality and colouring |
| Comparative experiment | | | | | | | | | | |
| (e) | 68:32 | 0.73 | 0.49 | 0.59 | 0.72 | 99 | undetermined | 9.7 | 115 | dark brown |
| (f) | 69:31 | 0.80 | 0.58 | 0.55 | 1.09 | 99 | 19.2 | 10.9 | 116 | brown |
| (g) | 70:30 | 0.64 | 0.55 | 0.67 | 0.85 | 100 | 18.7 | 10.8 | 113 | brown |
| (h) | 74:26 | 0.813 | 1.36 | 1.61 | 1.80 | 96 | 11.5 | 10.5 | 110 | light, affected by streaks |
| (i) | 76:24 | 1.102 | 2.08 | 2.55 | 2.79 | 94 | undetermined | 10.4 | 110 | as before |
| Example | | | | | | | | | | |
| 1 | 73:27 | 1.05 | 1.18 | 0.90 | 1.25 | 98 | 11.1 | 10.6 | 116 | light; imperfection-free |
| 2 | 72:28 | 0.86 | 0.92 | 1.12 | 1.25 | 98 | 7.1 | 10.0 | 119 | light; imperfection free |
| 3 | 71:29 | 0.93 | 1.19 | 0.98 | 1.11 | 98 | 12.5 | 10.0 | 117 | light; imperfection-free |

We claim:

1. Copolymers of from 65 to 75% by weight, of α-methyl styrene and from 35 to 25%, by weight, of acrylonitrile, obtained by radical emulsion polymerisation, in which the monomers are metered in during polymerisation, wherein the ratio (mol α-methyl styrene)(mol acrylonitrile)

of the unreacted monomers found in the reaction mixture is maintained during the metering phase between 0.7 and 1.25.

2. Copolymers according to claim 1, which contain polymerised from 71 to 73%, by weight, of α-methyl styrene and from 29 to 27%, by weight, acrylonitrile.

3. A process for producing copolymers containing from 65 to 75% by weight of copolymerized alpha-methylstyrene units and from 35 to 25% by weight of copolymerized acrylonitrile units which comprises copolymerizing alpha-methylstyrene and acrylonitrile in aqueous emulsion with a radical catalyst wherein during the polymerization a molar ratio of unreacted alpha-methylstyrene:acrylonitrile is maintained between 0.7 and 1.25.

4. A process according to claim 3 wherein from 75 to 73% by weight of alpha-methylstyrene and from 29 to 27% by weight of acrylonitrile are copolymerized.

* * * * *